United States Patent [19]

Hotger

[11] 4,449,738
[45] May 22, 1984

[54] ROTARY FLUID COUPLING

[75] Inventor: Karl Hotger, Bochum, Fed. Rep. of Germany

[73] Assignee: Gebr. Eickhoff, Maschinenfabrik und Eisengiesserei, m.b.H., Bochum, Fed. Rep. of Germany

[21] Appl. No.: 217,618

[22] Filed: Dec. 18, 1980

[30] Foreign Application Priority Data

Dec. 24, 1979 [DE] Fed. Rep. of Germany ....... 2952272

[51] Int. Cl.³ .............................................. F16L 17/00
[52] U.S. Cl. ........................................ 285/11; 285/94; 285/98; 285/190; 285/281
[58] Field of Search ..................... 285/11, 94, 190, 98, 285/281

[56] References Cited

U.S. PATENT DOCUMENTS

| | | | |
|---|---|---|---|
| 2,210,088 | 8/1940 | Longfield | 285/190 X |
| 2,270,927 | 1/1942 | Braune | 285/94 |
| 3,479,061 | 11/1969 | Smookley et al. | 285/94 |
| 3,746,372 | 7/1973 | Hynes et al. | 285/94 |

*Primary Examiner*—Dave W. Arola
*Attorney, Agent, or Firm*—Thomas H. Murray

[57] ABSTRACT

A rotary fluid coupling for conveying fluid from a stationary shaft to a hub rotatably mounted on the shaft, or vice versa. The coupling is characterized in having a shaft provided with an axial passageway extending therethrough, one end of the passageway being connected to a source of high pressure fluid and the other being connected to a source of high-viscosity sealing fluid (e.g., a lubricant). A piston in the passageway separates the high-viscosity sealing fluid from the high pressure fluid, the latter being conveyed to the surrounding hub through radial passageways formed in an enlarged diameter portion of the shaft. The high-viscosity sealing fluid is applied to both ends of the enlarged diameter portion of the shaft to form a seal which prevents escape of the high pressure fluid.

4 Claims, 1 Drawing Figure

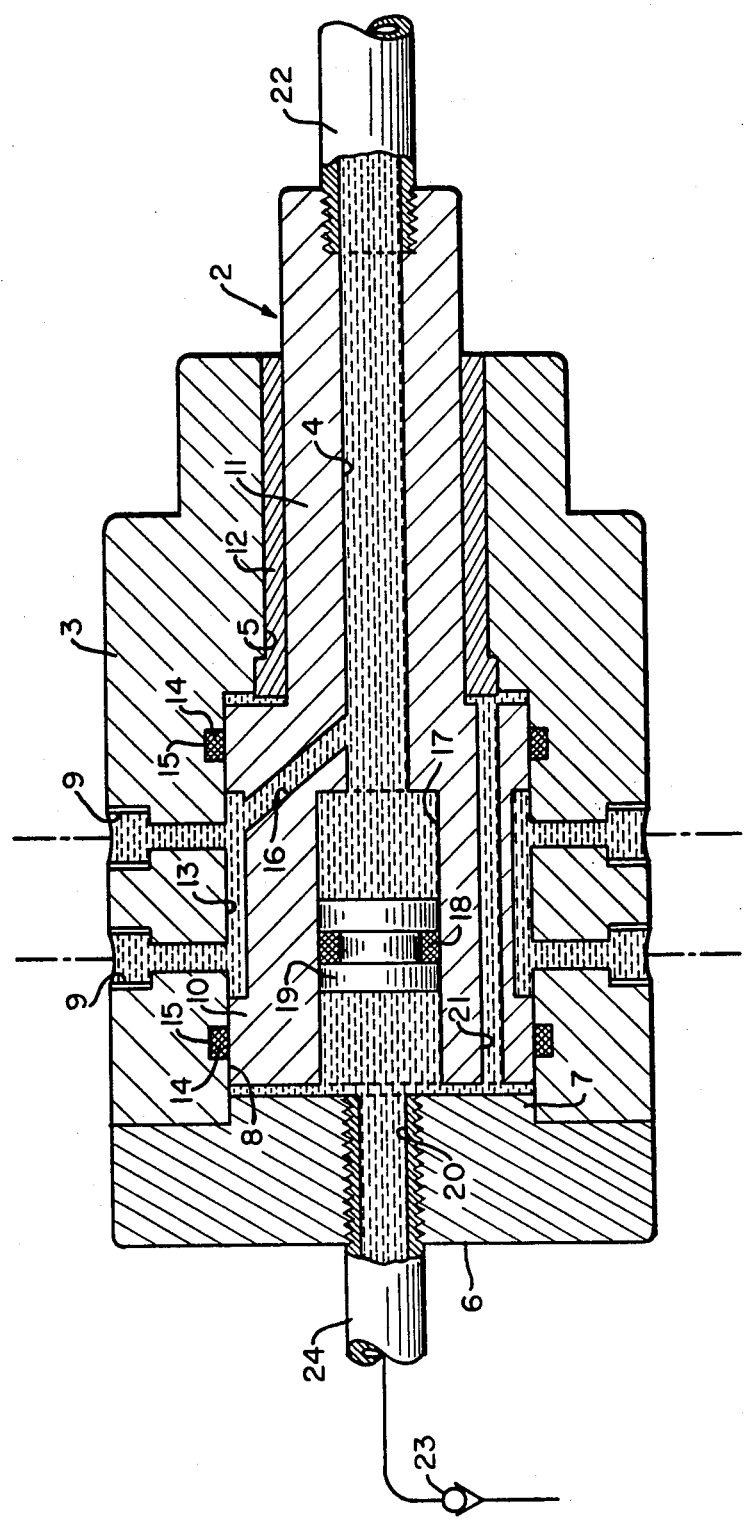

4,449,738

ROTARY FLUID COUPLING

BACKGROUND OF THE INVENTION

As is known, a rotary fluid coupling enables liquid to be transferred between two relatively rotating parts, such as a stationary shaft and the hub of a shearing drum of a mining machine, the hub being rotatably mounted on the shaft. One such rotary fluid coupling is shown in copending application Ser. No. 135,404, filed Mar. 31, 1980. In that application, a rotary fluid coupling is provided wherein a bore in a hub element receives a shaft element which is rotatable relative thereto. An annular piston surrounds the shaft and is reciprocable within the bore. This piston forms the wall of a chamber which connects a duct in the shaft element to a duct in the hub element. High-viscosity lubricating material is disposed between the piston and a seal which surrounds the shaft element such that the seal, via the lubricant, is exposed to pressure exerted on the piston by fluid in the aforesaid chamber interconnecting the two ducts.

In a coupling of the type shown in the aforesaid application Ser. No. 135,404, the high pressure of the fluid in the chamber interconnecting the two ducts acts on the annular piston and applies to the lubricating material between the piston and the seal a pressure which corresponds to the pressure of the liquid flowing through the annular chamber. This precludes any transfer of fluid from one side of the annular piston to the other. The pressure acting on the piston causes only a small portion of the high-viscosity lubricant to issue through the gaps of the seal, preferably a labyrinth seal, and travel through bushings at opposite ends of the hub through which the aforesaid shaft extends.

SUMMARY OF THE INVENTION

In accordance with the present invention, a rotary fluid coupling is provided which eliminates the need for an annular piston surrounding the shaft and labyrinth seals, but at the same time employs the use of a high-viscosity sealing material or lubricant to prevent the escape of high pressure fluid being conveyed between the shaft and hub elements.

Specifically, there is provided a rotary fluid coupling for interconnecting a fluid-conveying duct in a shaft element to a duct in a hub element with at least one of said elements being rotatable relative to the other. The fluid coupling comprises a bore in the hub which receives said shaft, the bore and the shaft having cooperating large diameter portions communicating with smaller diameter portions. An axial passageway extends through the shaft and is adapted to be connected at one end to a source of liquid under high pressure and at its other end to a high-viscosity sealing material or lubricant. A piston in the axial passageway separates the fluid under high pressure from the sealing material; while radial passageways connect the high pressure fluid in the passageway to an annular groove in the periphery of the large diameter shaft portion. Passageways connect the high-viscosity sealing material in the passageway to both ends of the large diameter shaft portion, thereby forming a seal on opposite sides of the annular groove in the large diameter shaft portion which, in turn, communicates with radial passageways in the hub element.

The dimensions of a seal of the type described herein are reduced with respect to prior art seals which employ an annular piston surrounding the shaft. The seal, therefore, is of reduced diameter and the gap lengths of its sealing surfaces, where leakage can occur, are also reduced. At the same time, the construction of the coupling is very simple and reliable in operation and is particularly suitable for use in shearer drums for underground longwall mining machines having on their peripheries nozzles which spray either water to control dust or high pressure water jets to assist the cutting tools carried on the shearer drums.

The above and other objects and features of the invention will become apparent from the following detailed description taken in connection with the accompanying single FIGURE drawing which illustrates one embodiment of the invention.

With reference now to the drawing, the rotary coupling of the invention is identified generally by the reference numeral 1 and comprises a cylindrical shaft 2 received within a bore 5 formed in a surrounding hub 3, the shaft 2 being rotatable relative to the hub 3. The shaft 2 is provided at its left end with an enlarged diameter portion 10 received within a corresponding large diameter portion 8 of the bore 5. An end cap 6 seals the left end of the bore 5 and has an end wall portion 7 which extends into the enlarged diameter portion 8 of bore 5.

Extending through the end cap 6 is a central passageway 20 which is coaxial with a passageway 4 formed in the shaft 2. The passageway 4, at its left end, is provided with a large diameter portion 17 which receives a piston 19 provided with a surrounding seal 18. Radial passageways 16 connect the passageway 4 to an annular groove 13 formed in the enlarged diameter portion 10 of shaft 2. The annular groove 13, in turn, communicates with ports 9 formed in the wall of the hub 3 such that high pressure fluid in passageway 4 can be directed to the ports 9, or vice versa, even though there is relative rotation between the elements 2 and 3.

A bushing 12 supports the shank or small diameter portion 11 of the shaft 2 as shown. Seals 14 on either side of the groove 13 are received within annular grooves 15 formed in the hub 3. High pressure fluid from conduit 22 flows into the passageway 4 and through radial passageways 16 to the groove 13 and ports 9. At the same time, a high-viscosity sealing material (e.g., a high-viscosity lubricant) flows through a check valve 23 in line 24 and through passageway 20 to the left end of the passageway 4 and one side of the piston 19. The pressure of the high-viscosity lubricant, of course, should be the same as that of the fluid entering the right end of passageway 4. It will be noted that the large diameter portion 10 of the shaft 2 is not as long as the large diameter portion 8 of the bore 5 in hub 3. Consequently, there is clearance between the hub and the portion 10 at one end, and between the cap 6 and the portion 10 at the other end. A passageway 21 interconnects opposite ends of the large diameter portion 10. Consequently, the high-viscosity lubricant will flow into the spaces at both ends of the enlarged diameter portion 10. Because of its relatively high viscosity, the sealing material prevents high pressure liquid from issuing from the annular groove 13 by way of the end faces of enlarged diameter portion 10.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. A rotary fluid coupling for interconnecting a liquid-conveying duct in a shaft element to a duct in a hub element, at least one of said elements being rotatable relative to the other, said fluid coupling comprising a bore in said hub element which receives said shaft element, said bore and said shaft element having cooperating large diameter portions communicating with smaller diameter portions, the large diameter portion of the bore terminating at one end in an end wall and at its other end in a shoulder which separates the large and small diameter portions of the bore, said end wall and shoulder limiting axial movement of said shaft element within said hub element, an axial passageway extending through the shaft element and adapted to be connected at one end to a source of fluid under high pressure and at its other end to a high-viscosity sealing material, and piston means in the axial passageway to separate the fluid under high pressure from said sealing material, an annular groove in the periphery of said large diameter shaft portion, radial passageway means connecting high pressure fluid in said passageway to said annular groove in the periphery of said large diameter shaft portion, and means connecting the high-viscosity sealing material in said passageway to both ends of said large diameter shaft portion to prevent the escape of fluid from said annular groove.

2. The fluid coupling of claim 1 wherein said high-viscosity sealing material comprises a high-viscosity lubricant.

3. The fluid coupling of claim 1 including annular seals carried in annular grooves in said bore in the hub on opposite sides of said annular groove in the periphery of said large diameter shaft portion.

4. The fluid coupling of claim 1 wherein said large diameter bore section is longer than said large diameter shaft portion to provide clearances between the ends of the large diameter shaft portion and the large diameter bore portion, and wherein said means connecting includes an axial passageway extending through said large diameter shaft portion and through which said high-viscosity sealing material can flow from one end of the large diameter shaft portion to the other.

* * * * *